(12) United States Patent
Carr et al.

(10) Patent No.: US 7,616,103 B2
(45) Date of Patent: Nov. 10, 2009

(54) FLEXIBLE FUEL PREDICTION AND DRIVER MESSAGE DISPLAY

(75) Inventors: Mark D. Carr, Fenton, MI (US); Bahram Younessi, Farmington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 331 days.

(21) Appl. No.: 11/561,493

(22) Filed: Nov. 20, 2006

(65) Prior Publication Data

US 2008/0115768 A1    May 22, 2008

(51) Int. Cl.
 *B60Q 1/00* (2006.01)
(52) U.S. Cl. .................... 340/438; 340/439
(58) Field of Classification Search ........... 340/438, 340/439, 441, 500, 517, 457.4; 123/1 A, 123/694; 429/13; 73/23.23, 114.38; 210/695; 141/97; 701/114
See application file for complete search history.

(56) References Cited

U.S. PATENT DOCUMENTS

| | | | | |
|---|---|---|---|---|
| 5,382,942 A * | 1/1995 | Raffa et al. | ............... | 340/457.4 |
| 5,970,968 A * | 10/1999 | Davis | ............... | 123/694 |
| 6,041,278 A * | 3/2000 | Kennie et al. | ............... | 701/103 |
| 6,209,385 B1 * | 4/2001 | Silvis | ............... | 73/23.32 |
| 6,714,856 B2 * | 3/2004 | Huff et al. | ............... | 701/114 |
| 7,051,772 B2 * | 5/2006 | Dillon | ............... | 141/97 |
| 7,357,101 B2 * | 4/2008 | Boyarski | ............... | 123/1 A |
| 7,384,560 B2 * | 6/2008 | Martens et al. | ............... | 210/695 |
| 2006/0083961 A1 * | 4/2006 | Piccirillo et al. | ............... | 429/13 |
| 2006/0283193 A1 * | 12/2006 | Nilsson | ............... | 60/776 |

* cited by examiner

Primary Examiner—Van T. Trieu

(57) ABSTRACT

A fault system for flexible fuel systems is provided. The system includes: a fault monitor module that monitors fuel estimation inputs and detects fuel estimation faults; and a fuel estimation module that selectively estimates a concentration level based on whether a fuel estimation fault is detected.

20 Claims, 3 Drawing Sheets

FLEXIBLE FUEL PREDICTION AND DRIVER MESSAGE DISPLAY

FIELD

The present disclosure relates to methods and systems for flexible fuel systems.

BACKGROUND

The statements in this section merely provide background information related to the present disclosure and may not constitute prior art.

Ethanol, also know as ethyl alcohol, is a flammable, colorless chemical compound that can be mixed with gasoline to fuel an internal combustion engine. Flexible fuel vehicles include adaptations that allow the vehicle to run on various blends of gasoline and ethanol. For example, E85 fuel contains a mixture of 85% ethanol and 15% gasoline. A virtual flex fuel sensor along with a fuel estimation method determines a concentration of ethanol in the fuel. Based on the concentration level, the air/fuel ratio is adjusted and the engine operation is controlled accordingly.

If a fault were to occur on any one of the inputs to the fuel estimation system, the estimation method typically is disabled. Therefore, the estimate of the concentration level is not updated. If a refuel event were to occur after disabling the estimation method, the actual ethanol concentration level could diverge from the estimated concentration level. For example, if the vehicle contained E85 fuel prior to the fault and the driver added gasoline after the fault, the estimate will be very different from the actual concentration level. An incorrect estimation can impact vehicle startability and vehicle drivability.

SUMMARY

Accordingly, a fault system for flexible fuel systems is provided. The system includes: a fault monitor module that monitors fuel estimation inputs and detects fuel estimation faults; and a fuel estimation module that selectively estimates a concentration level based on whether a fuel estimation fault is detected.

In other features, a flexible fuel fault warning system for a vehicle is provided. The system includes: a warning lamp that illuminates based on a flexible fuel fault indicator signal. The warning lamp includes a flexible fuel fault warning message.

Still in other features, a monitoring method for a flexible fuel system is provided. The method includes: monitoring the flexible fuel system for faults; generating a fault indicator signal when a fault is detected; and selectively estimating a concentration level of the fuel system based on whether a fault is detected.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
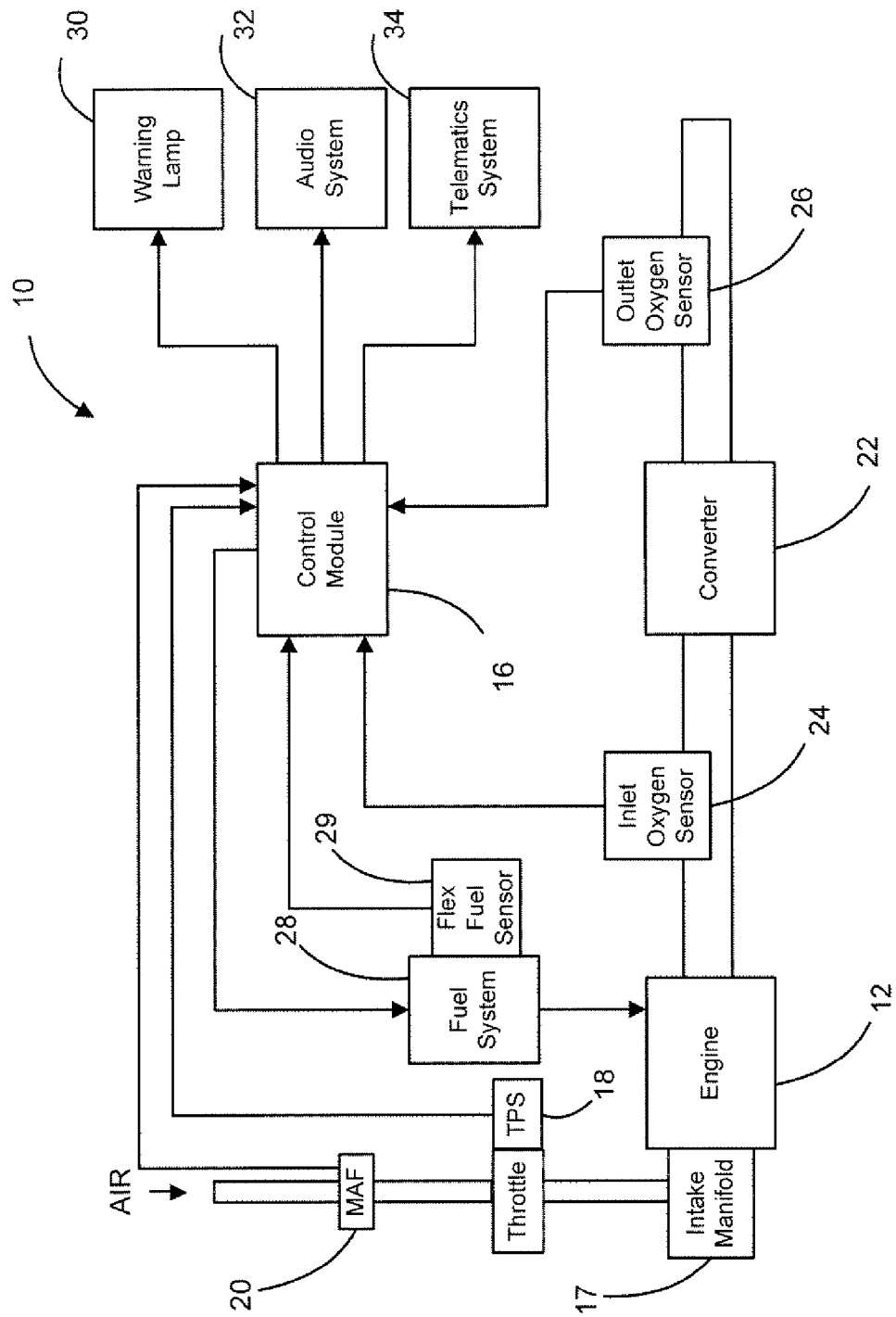
FIG. 1 is a functional block diagram of a vehicle including a flexible fuel system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 includes an engine 12, an exhaust system 14, and a control module 16. The engine 12 includes an intake manifold 17, a throttle position sensor (TPS) 18, and a mass air flow (MAF) sensor 20. The throttle position sensor 18 and the MAF sensor 20 communicate with the control module 16. The exhaust system 14 includes a catalytic converter 22, a pre-catalyst or inlet oxygen sensor 24, and a post-catalyst or outlet oxygen sensor 26. The inlet and outlet oxygen sensors 24, 26 communicate with the control module 16 to provide inlet and outlet F/A ratio signals, respectfully. The control module 16 communicates with a fuel system 28 to regulate fuel flow to the engine 12.

The control module 16 includes a fuel estimation system that estimates a composition of fuel in the fuel system 28. In various embodiments, the fuel system 28 may include a flex fuel sensor 29. The flex fuel sensor 29 generates a fuel signal to the control module 16. The fuel estimation system interprets a composition of the fuel based on the fuel signal. In various other embodiments, the fuel estimation system estimates a composition of the fuel in the fuel system based on engine operating parameters. For example, the fuel estimation system may estimate a concentration of ethanol in the fuel system based on fuel trim values. This method is described in commonly assigned U.S. patent application Ser. No. 11/232,704, and incorporated herein by reference.

Based on the fuel composition, the control module 16 regulates the F/A ratio of the engine 12. In addition, the control module 16 monitors the engine 12 and fuel system 28 for faults. Faulty sensor readings may occur that affect the estimate of the composition. When related faults are detected, the control module 16 controls the engine 12 and fuel system 28 and communicates with a warning system based on the flexible fuel fault method of the present disclosure. The warning system may include at least one of a warning lamp 30, an audio system 32, and a telematics system 34 (i.e., Onstar®). The warning system notifies one or more persons of the fault.

Figure 2:
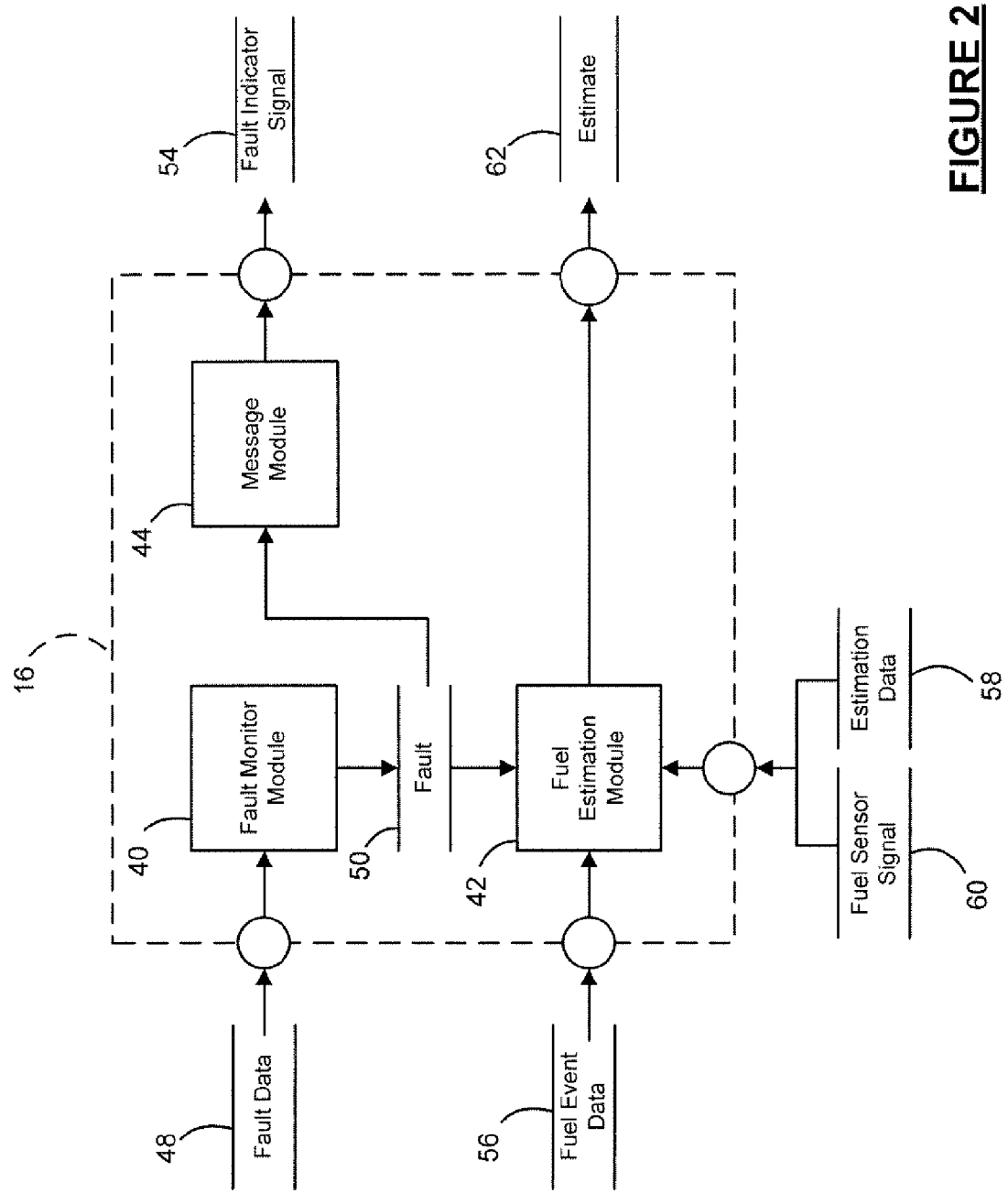
FIG. 2 is a dataflow diagram illustrating a flexible fuel fault system.

Referring now to FIG. 2, a dataflow diagram illustrates various embodiments of a flexible fuel fault system that may be embedded within the control module 16. Various embodiments of flexible fuel fault systems according to the present disclosure may include any number of sub-modules embedded within the control module 16. The sub-modules shown may be combined and/or further partitioned to similarly provide control when a fault occurs. Inputs to the system may be received from sensors within the vehicle 10, received from other control modules (not shown) within the vehicle 10, and/or determined by other sub-modules (not shown) within the control module 16. In various embodiments, the control module 16 of FIG. 2 includes a fault monitor module 40, a fuel estimation module 42, and a message module 44.

The fault monitor module 40 receives as input fault data 48 corresponding to faults relating to fuel estimation (e.g. flex fuel sensor faults, vehicle speed faults, MAF faults, purge solenoid faults, fuel trim faults, and oxygen sensor faults). If the fault data 48 indicates that one or more of the inputs to the fuel estimation system are faulty, a fault flag 50 is set accordingly. The message module 44 receives the fault flag 50 and issues a fault indicator signal 52 accordingly. In various embodiments, the fault indicator signal 52 illuminates the warning lamp 30 of FIG. 1. Wherein the warning lamp 30 may illuminate a message including, but not limited to, "Service Engine Soon" or "Use Unleaded Gasoline Only." In various embodiments, the fault indicator signal 52 initiates an audible warning signal to the audio system 32 located within the vehicle 10 of FIG. 1. In various embodiments, the fault indicator signal 52 contains a diagnostic code. Wherein the diagnostic code can be transmitted via the telematics system 34 of FIG. 1 to a remote location or retrieved via a service tool (not shown) in communication with the vehicle 10.

The fuel estimation module 42 receives as input the fault flag 50, fuel event data 56, and fuel estimation data 58 and/or the flex fuel sensor signal 60. The fuel estimation module 42 generates an estimate 62 of a concentration level of ethanol in the fuel system 28 of FIG. 1 after each refuel event according to one of at least two estimation methods. If the fault flag 50 indicates no faults were detected, the estimate 62 level is determined according to conventional estimation methods such as according to fuel trim values as described above.

If the fault flag 50 indicates a fault was detected, the fuel estimation module 42 computes estimate 62 based on a weighted volume average method. The weighted volume average method computes the estimate 62 of the ethanol concentration level based on a current and a previous fuel volume, a previous ethanol percent, and assuming that gasoline was added during the refuel event. After a number of refuel events, by using the weighted volume average method, the estimated concentration level will converge with the actual concentration level and hence improve startability and drivability.

Figure 3:
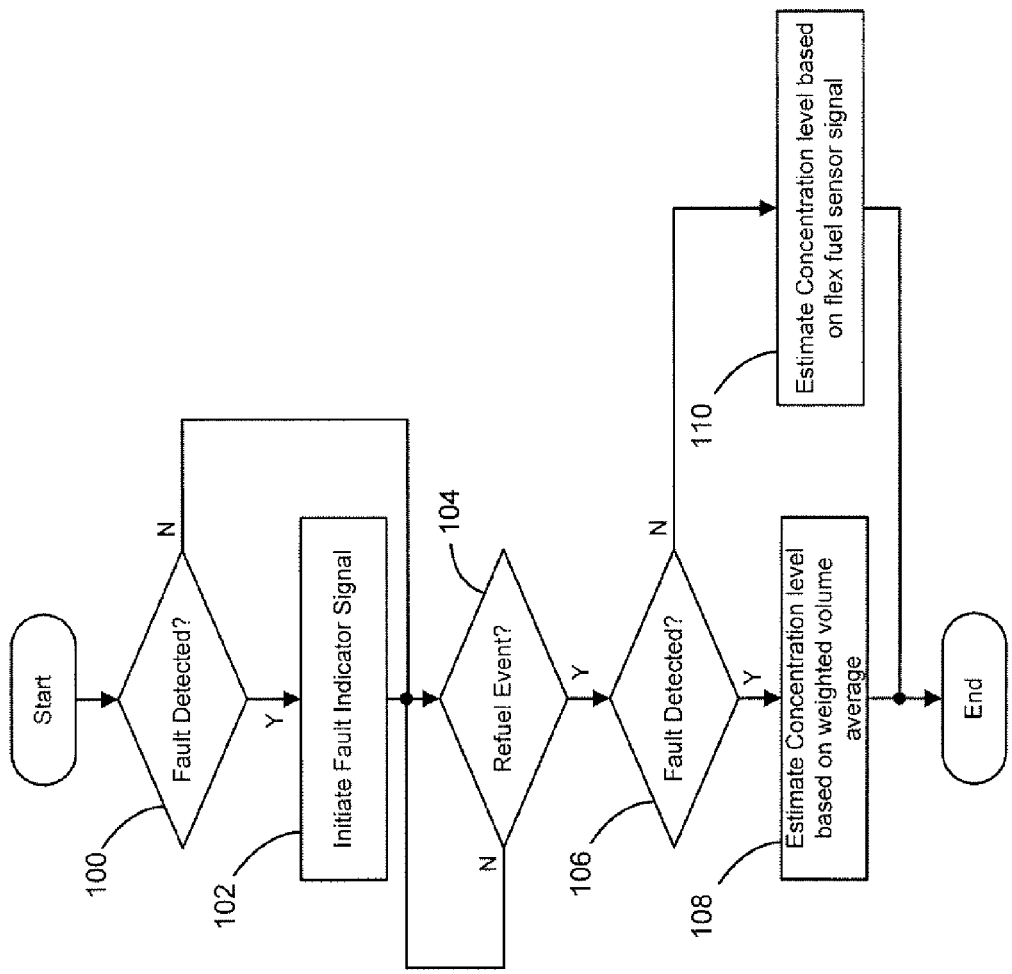
FIG. 3 is a flowchart illustrating a flexible fuel fault method.

Referring now to FIG. 3, a flowchart illustrates a flexible fuel fault method as performed by the control module 16. The method may be run periodically during engine operation. Control monitors fault conditions at 100. If fault data indicates that one or more inputs to the fuel estimation system are faulty at 102, a fault indicator signal is initiated at 102. Otherwise control proceeds to monitor for a refuel event at 104. If a refuel event occurs at 104 and a fault is detected at 106, a concentration level is estimated based on the weighted volume average method as discussed above at 108. Otherwise, if a refuel event occurs at 104 and no faults have been detected at 106, a concentration level is estimated based on a conventional method such as according to a flex fuel sensor signal at 110 as discussed above. Otherwise, if a refuel event has not been detected, control loops back and continues to monitor for a refuel event at 104.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A fault system for flexible fuel systems, comprising:
   a fault monitor module that monitors fuel estimation inputs and detects flexible fuel estimation faults; and
   a fuel estimation module that selectively estimates a concentration level of a flexible fuel based on whether a flexible fuel estimation fault is detected.

2. The system of claim 1 wherein the fuel estimation module estimates the concentration level based on a weighted volume average method when at least one fuel estimation fault is detected.

3. The system of claim 1 wherein the fuel estimation module estimates a concentration level of ethanol present in the flexible fuel of the fuel system.

4. The system of claim 1 wherein the fuel estimation module estimates the concentration level based on a flex fuel sensor signal when no flexible fuel estimation faults are detected.

5. The system of claim 1 further comprising a message module that initiates a fault indicator signal based on whether the flexible fuel estimation fault is detected.

6. The system of claim 5 wherein the message module initiates a fault indicator signal that illuminates a warning lamp.

7. The system of claim 5 wherein the message module initiates a fault indicator signal to an audio system that produces an audible warning signal.

8. The system of claim 5 wherein the message module initiates a fault indicator signal that is transmitted via a telematics system to a remote location.

9. The system of claim 5 wherein the message module initiates a fault indicator signal that is retrievable via a service technician tool.

10. A flexible fuel fault warning system for a vehicle, comprising:
    a warning lamp that illuminates based on a flexible fuel fault indicator signal; and
    wherein the warning lamp includes a flexible fuel fault warning message and a message directing a user to only use unleaded gasoline.

11. The system of claim 10 further comprising a control module that monitors faults related to a flexible fuel estimation system and that initiates the flexible fuel fault indicator signal based on the faults.

12. The system of claim 10 further comprising an audio system that generates an audible signal based on the flexible fuel fault indicator signal.

13. The system of claim 10 further comprising a telematics system that transmits fault data based on the flexible fuel fault indicator signal.

14. A monitoring method for a flexible fuel system, comprising:
    monitoring the flexible fuel system for faults;
    generating a fault indicator signal when a flexible fuel fault is detected; and
    selectively estimating a concentration level of a flexible fuel in the fuel system based on whether the flexible fuel fault is detected.

15. The method of claim 14 further comprising:
    monitoring the flexible fuel system for a refuel event; and
    wherein the selectively estimating occurs after a refuel event.

16. The method of claim 14 wherein the selectively estimating comprises estimating a concentration level based on a weighted volume average method when a fault is detected.

17. The method of claim 16 wherein the selectively estimating further comprises estimating a concentration level based on a flex fuel sensor signal when a fault is not detected.

18. The method of claim 16 wherein the selectively estimating further comprises estimating a concentration level based on engine operating parameters when a fault is not detected.

19. The method of claim 14 wherein the selectively estimating comprises selectively estimating a concentration of ethanol in fuel of the fuel system.

20. The method of claim 14 wherein the initiating an indicator signal comprises at least one of: initiating an indicator signal that illuminates a warning lamp; initiating an indicator signal that produces an audible warning signal; initiating an indicator signal that is transmitted via a telematics system; and initiating an indicator signal that is retrievable via a service tool.

* * * * *